United States Patent
Nishio et al.

(10) Patent No.: US 9,031,011 B2
(45) Date of Patent: May 12, 2015

(54) WIRELESS COMMUNICATION TERMINAL APPARATUS, WIRELESS COMMUNICATION BASE STATION APPARATUS, AND MODULATION METHOD

(75) Inventors: Akihiko Nishio, Kanagawa (JP); Seigo Nakao, Kanagawa (JP); Daichi Imamura, Kanagawa (JP); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 455 days.

(21) Appl. No.: 13/125,436

(22) PCT Filed: Oct. 30, 2009

(86) PCT No.: PCT/JP2009/005790
§ 371 (c)(1),
(2), (4) Date: Apr. 21, 2011

(87) PCT Pub. No.: WO2010/050233
PCT Pub. Date: May 6, 2010

(65) Prior Publication Data
US 2011/0200000 A1    Aug. 18, 2011

(30) Foreign Application Priority Data

Oct. 31, 2008  (JP) .................................. 2008-281391

(51) Int. Cl.
*H04W 4/00* (2009.01)
*H04J 11/00* (2006.01)
(Continued)

(52) U.S. Cl.
CPC .............. *H04J 11/00* (2013.01); *H04J 13/0059* (2013.01); *H04L 1/0046* (2013.01);
(Continued)

(58) Field of Classification Search
CPC ... H04L 5/0048; H04L 5/0091; H04L 5/0053; H04L 5/0055; H04L 27/18; H04L 5/0044; H04L 1/0009; H04L 1/0003; H04L 5/001; H04L 27/2647; H04W 72/042; H04W 72/0446; H04W 72/04; H04W 28/0236; H04W 72/0413; H04W 72/1273

USPC ........... 370/328–329, 252, 254, 277; 455/509
See application file for complete search history.

(56) References Cited

U.S. PATENT DOCUMENTS

2006/0270431 A1    11/2006  Yoshi
2009/0073922 A1*   3/2009   Malladi et al. ................ 370/328
(Continued)

FOREIGN PATENT DOCUMENTS

GB    2343342 A    5/2000
JP    06-338878 A    12/1994
(Continued)

OTHER PUBLICATIONS

International Search Report for PCT/JP2009/005790 dated Dec. 15, 2009.
(Continued)

*Primary Examiner* — Melanie Jagannathan
*Assistant Examiner* — Najeebuddin Ansari
(74) *Attorney, Agent, or Firm* — Pearne & Gordon LLP

(57) ABSTRACT

A wireless communication terminal apparatus wherein even in a case of performing a wideband transmission using only a downstream line, CCE assignment can be flexibly performed without any collisions of ACK and NACK signals among a plurality of unit bands. In a wireless communication terminal apparatus (200) using a plurality of downstream unit bands to perform communications, a PDCCH receiving unit (207) blind-decodes CCE in a search space of the plurality of downstream unit bands, thereby acquiring resource assignment information of downstream line data addressed to the wireless communication terminal apparatus (200), and a modulating unit (209) modulates a response signal, which is responsive to the downstream line data in particular downstream unit bands, based on a modulation scheme in which the number of modulation multi-values corresponds to the number of those particular ones of the plurality of downstream unit bands in which the resource assignment information addressed to the wireless communication terminal apparatus (200) is assigned to CCE of the same CCE number.

10 Claims, 8 Drawing Sheets

(51) Int. Cl.
*H04J 13/00* (2011.01)
*H04L 1/00* (2006.01)
*H04L 1/18* (2006.01)
*H04L 5/00* (2006.01)

(52) U.S. Cl.
CPC ........... *H04L 1/1861* (2013.01); *H04L 5/0007* (2013.01); *H04L 5/001* (2013.01); *H04L 5/0053* (2013.01); *H04L 5/0055* (2013.01)

(56) References Cited

U.S. PATENT DOCUMENTS

| | | | | |
|---|---|---|---|---|
| 2009/0279493 | A1* | 11/2009 | Gaal et al. | 370/329 |
| 2010/0008317 | A1* | 1/2010 | Bhattad et al. | 370/329 |
| 2010/0103902 | A1* | 4/2010 | Kim et al. | 370/330 |
| 2010/0183086 | A1* | 7/2010 | Ko et al. | 375/260 |
| 2010/0296460 | A1* | 11/2010 | Akimoto et al. | 370/329 |
| 2010/0296473 | A1* | 11/2010 | Kim et al. | 370/329 |
| 2011/0183697 | A1* | 7/2011 | Akimoto et al. | 455/509 |

FOREIGN PATENT DOCUMENTS

| | | |
|---|---|---|
| JP | 2000-232687 A | 8/2000 |
| JP | 2003-298507 A | 10/2003 |
| WO | 2005/018125 A1 | 2/2005 |

OTHER PUBLICATIONS

3GPP TS 36.211 V8.3.0, "Physical Channels and Modulation (Release 8)," May 2008.
3GPP TS 36.212 V8.3.0, "Multiplexing and channel coding (Release 8)," May 2008.
3GPP TS 36.213 V8.3.0, "Physical layer procedures (Release 8)," May 2008.
3GPP TSG RAN WG1 meeting, R1-082468, "Carrier aggregation LTE-Advanced," Jul. 2008.
Huawei, DL/UL Asymmetric Carrier aggregation, 3GPP TSG-RAN-WG1 Meeting #54bis R1-083706, Sep. 29, 2008, pp. 1-4.
Samsung, UL ACK/NAK Transmission in LTE-A, 3GPP TSG RAN WG1 #56bis R1-091238, Mar. 23, 2009, pp. 1-3.
Panasonic, UL ACK/NACK transmission on PUCCH for carrier aggregation, 3GPP TSG-RAN WG1 Meeting #57bis R1-092535, Jun. 29, 2009, pp. 1-4.
Panasonic, Support of UL/DL asymmetric carrier aggregation, 3GPP TSG RAN WG1 Meeting #54 R1-082999, Aug. 18, 2008, pp. 1-3.
Panasonic, PUCCH resource allocation schemes for carrier aggregation, 3GPP TSG RAN WG1 Meeting #58bis R1-093943, Oct. 12, 2009, pp. 1-2.
Panasonic, PDCCH design for carrier aggregation, 3GPP TSG-RAN WG1 Meeting #57 R1-091743, May 4, 2009, pp. 1-9.
Huawei, PUCCH design for carrier aggregation, 3GPP TSG RAN WG1 Meeting #56bis R1-091275, Mar. 23, 2009, pp. 1-8.
Huawei, PUCCH design for carrier aggregation, 3GPP TSG RAN WG1 Meeting #58bis R1-093838, Oct. 12, 2009, pp. 1-6.
ZTE, ACK/NACK Design for LTE-Advanced, TSG-RAN WG1 #58bis R1-093821, Oct. 12, 2009, pp. 1-9.
UL RB Mapping and Slot-Level Re-mapping for ACK/NACK and CQI, Samsung, Agenda Item : 6.2.4, 3GPP TSG RAN WG1 Meeting #51 Jeju, Korea, Nov. 5-9, 2007 R1-074785.

* cited by examiner

WIRELESS COMMUNICATION TERMINAL APPARATUS, WIRELESS COMMUNICATION BASE STATION APPARATUS, AND MODULATION METHOD

TECHNICAL FIELD

The present invention relates to a radio communication terminal apparatus, a radio communication base station apparatus and a modulation method.

BACKGROUND ART

3GPP-LTE (3rd Generation Partnership Project Radio Access Network Long Term Evolution, hereinafter referred to as "LTE") adopts OFDMA (Orthogonal Frequency Division Multiple Access) as a downlink communication scheme and adopts SC-FDMA (Single Carrier Frequency Division Multiple Access) as an uplink communication scheme (e.g. see non-patent literatures 1, 2 and 3).

According to LTE, a radio communication base station apparatus (hereinafter, abbreviated as "base station") performs communication by allocating resource blocks (RB's) in a system band to a radio communication terminal apparatus (hereinafter, abbreviated as "terminal") per time unit called "subframe." Furthermore, the base station transmits control information for notifying results of resource allocation of downlink data and uplink data to the terminal. This control information is transmitted to the terminal using a downlink control channel such as PDCCH (Physical Downlink Control Channel). Here, each PDCCH occupies a resource made up of one or a plurality of continuous CCEs (Control Channel Elements). LTE supports a frequency band having a width of maximum 20 MHz as a system bandwidth.

Furthermore, the base station simultaneously transmits a plurality of PDCCHs to allocate a plurality of terminals to one subframe. In this case, the base station includes CRC bits masked (or scrambled) with destination terminal IDs to identify the respective PDCCH destination terminals in the PDCCHs and transmits the PDCCHs. The terminal demasks (or descrambles) the CRC bits in a plurality of PDCCHs which may be directed to the terminal with the terminal ID of the terminal and thereby blind-decodes the PDCCHs and detects a PDCCH directed to the terminal.

Furthermore, studies are being carried out on a method of limiting CCEs to be subjected to blind decoding for each terminal for the purpose of reducing the number of times blind decoding is performed at the terminal. This method limits a CCE area to be subjected to blind decoding (hereinafter referred to as "search space") for each terminal. Thus, each terminal needs to perform blind decoding only on CCEs in the search space allocated to that terminal and can reduce the number of times to perform blind decoding. Here, the search space of each terminal is set using the terminal ID of each terminal and a hash function which is a function for performing randomization.

Furthermore, as for downlink data from the base station to the terminal, the terminal feeds back an ACK/NACK signal indicating an error detection result of the downlink data to the base station. The ACK/NACK signal is transmitted to the base station using an uplink control channel such as PUCCH (Physical Uplink Control Channel). Here, studies are being carried out on associating CCEs with a PUCCH to eliminate the necessity of signaling for notifying the PUCCH used to transmit an ACK/NACK signal from the base station to each terminal and thereby efficiently use downlink communication resources. Each terminal can decide a PUCCH to use to transmit an ACK/NACK signal from the terminal from the CCE to which control information directed to the terminal is mapped. The ACK/NACK signal is a 1-bit signal indicating ACK (no error) or NACK (error present), and is BPSK-modulated and transmitted.

Furthermore, standardization of 3GPP LTE-Advanced (hereinafter referred to as "LTE-A") has been started which realizes further speed enhancement of communication compared to LTE. LTE-A is expected to introduce a base station and a terminal (hereinafter referred to as "LTE+terminal") communicable at a wideband frequency of 40 MHz or above to realize a downlink transmission rate of maximum 1 Gbps or above and an uplink transmission rate of maximum 500 Mbps or above. Furthermore, the LTE-A system is required to accommodate not only an LTE+terminal but also terminals compatible with the LTE system.

LTE-A proposes a band aggregation scheme whereby communication is performed by aggregating a plurality of frequency bands to realize communication in a wideband of 40 MHz or above (e.g. see non-patent literature 1). For example, a frequency band having a bandwidth of 20 MHz is assumed to be a basic unit (hereinafter referred to as "component band"). Therefore, LTE-A realizes a system bandwidth of 40 MHz by aggregating two component bands.

Furthermore, according to LTE-A, the base station may notify resource allocation information of each component band to the terminal using a downlink component band of each component band (e.g. non-patent literature 4). For example, a terminal carrying out wideband transmission of 40 MHz (terminal using two component bands) obtains resource allocation information of two component bands by receiving a PDCCH arranged in the downlink component band of each component band.

Furthermore, according to LTE-A, the amounts of data transmission on an uplink and downlink are assumed to be independent of each other. For example, there may be a case where wideband transmission (communication band of 40 MHz) is performed on a downlink and narrowband transmission (communication band of 20 MHz) is performed on an uplink. In this case, the terminal uses two downlink component bands on the downlink and uses only one uplink component band on the uplink. That is, asymmetric component bands are used for the uplink and downlink (e.g. see non-patent literature 5). In this case, both ACK/NACK signals corresponding to downlink data transmitted with the two downlink component bands are transmitted to the base station using ACK/NACK resources arranged on a PUCCH of one uplink component band.

CITATION LIST

Non-Patent Literature

NPL 1
3GPP TS 36.211 V8.3.0, "Physical Channels and Modulation (Release 8)," May 2008
NPL 2
3GPP TS 36.212 V8.3.0, "Multiplexing and channel coding (Release 8)," May 2008
NPL 3
3GPP TS 36.213 V8.3.0, "Physical layer procedures (Release 8)," May 2008
NPL 4
3GPP TSG RAN WG1 meeting, R1-082468, "Carrier aggregation LTE-Advanced," July 2008

NPL 5
3GPP TSG RAN WG1 meeting, R1-083706, "DL/UL Asymmetric Carrier aggregation," September 2008

SUMMARY OF INVENTION

Technical Problem

When a plurality of downlink component bands and uplink component bands fewer than the plurality of downlink component bands are used as in the above-described prior art (when asymmetric component bands are used between the uplink and downlink), it is necessary to secure PUCCHs (ACK/NACK resources) to allocate ACK/NACK signals corresponding to downlink data for each of the plurality of downlink component bands for the uplink component bands. When PUCCHs (ACK/NACK resources) associated with CCEs for each of all downlink component bands are secured, the amount of resources required for the PUCCHs becomes enormous in the uplink component bands. Therefore, the amount of resources secured for uplink resources (e.g. PUSCH (Physical Uplink Shared Channel)) to which uplink data of the terminal is allocated decreases, and therefore data throughput deteriorates.

Thus, a PUCCH (ACK/NACK resource) arranged in one uplink component band may be shared between a plurality of downlink component bands, that is, one PUCCH (ACK/NACK resource) may be secured for all component bands. To be more specific, PUCCHs corresponding in number to CCEs per downlink component band (or maximum number of CCEs between a plurality of downlink component bands) are secured for the uplink component bands. CCEs of the same CCE number of each downlink component band are then associated with the same PUCCH. Thus, the terminal transmits an ACK/NACK signal corresponding to downlink data using a PUCCH (ACK/NACK resource) associated with a CCE regardless of the CCE of the downlink component band with which the downlink data is allocated.

A case will be described as an example where the terminal uses two component bands (component band 1 and component band 2). When performing wideband transmission (e.g. communication band of 40 MHz) only on a downlink, the terminal uses, for example, downlink component bands of both component band 1 and component band 2 on the downlink, whereas, on an uplink, the terminal uses only an uplink component band of component band 1 without using an uplink component band of component band 2. Furthermore, here, CCEs assigned the same CCE number (e.g. CCE #1, #2, . . . ) are arranged in the two downlink component bands so as to be able to accommodate LTE terminals. Furthermore, in the uplink component band, PUCCH #1 associated with CCE #1 and PUCCH #2 associated with CCE #2 are arranged, for example. Thus, CCEs #1 of the same CCE number arranged in the downlink component band of component band 1 and the downlink component band of component band 2 respectively are commonly associated with PUCCH #1. Likewise, CCEs #2 of the same CCE number arranged in the downlink component band of component band 1 and the downlink component band of component band 2 respectively are commonly associated with PUCCH #2. This makes it possible to prevent data throughput from deteriorating without increasing the amount of resources required for a control channel in the uplink component band. Furthermore, when consideration is given to the fact that there is a case where a PDCCH may be configured using a plurality of CCEs for each terminal or that there is a case where a PDCCH including allocation information of uplink data may be configured using CCEs (that is, when transmission of an ACK/NACK signal in the terminal is unnecessary), the probability that all PUCCHs arranged in the uplink component band will be used simultaneously is low. Thus, sharing a PUCCH between a plurality of component bands makes it possible to improve resource utilization efficiency of the PUCCH.

However, according to the method of sharing a PUCCH arranged in one uplink component band between a plurality of downlink component bands, CCE allocation to each terminal is limited to avoid collision between ACK/NACK signals at the base station. For example, an ACK/NACK signal corresponding to downlink data allocated using a PDCCH made up of CCE #1 of a downlink component band of component band 1 is allocated to PUCCH #1 associated with CCE #1. Therefore, when CCE #1 is used for allocation of downlink data in the downlink component band of component band 2, collision occurs between component band 2 and component band 1 in PUCCH #1. For this reason, the base station can no longer allocate CCE #1 in component band 2. Furthermore, as described above, since an available CCE area (search space) is set for each terminal, CCEs to which a PDCCH directed to each terminal is allocated are further limited.

Particularly, the greater the number of downlink component bands set in the terminal, the lower is the degree of CCE allocation to the terminal in the base station. For example, a case will be described where a search space made up of six CCEs is set for a terminal using five downlink component bands and one uplink component band. When a PDCCH is used in one-CCE units, there are six CCE allocation candidates directed to the terminal in a search space of each downlink component band. Here, of the six CCEs in the search space, when two CCEs are allocated to a PDCCH directed to another terminal, four CCEs (remaining CCEs in the search space) can be allocated to the terminal. Therefore, the PDCCH can no longer be allocated to all of five downlink component bands. Furthermore, since a control channel showing broadcast information having higher priority (e.g. BCH: Broadcast Channel) may be allocated to CCEs of the downlink component band, the number of CCEs that can be allocated in the search space further decreases in this case, consequently limiting data transmission.

It is an object of the present invention to provide a base station, a terminal and a modulation method capable of flexibly allocating CCEs without ACK/NACK signals colliding among a plurality of component bands even when performing wideband transmission on only a downlink.

Solution to Problem

A terminal of the present invention is a radio communication terminal apparatus that performs communication using a plurality of downlink component bands, and adopts a configuration including a receiving section that blind-decodes CCEs in a search space of the plurality of downlink component bands and obtains resource allocation information of downlink data directed to the radio communication terminal apparatus and a modulation section that modulates, based on a modulation scheme of an M-ary modulation value corresponding to the number of specific downlink component bands in which the resource allocation information directed to the radio communication terminal apparatus is allocated to CCEs of the same CCE number out of the plurality of downlink component bands, a response signal corresponding to the downlink data in the specific downlink component bands.

A base station of the present invention adopts a configuration including an allocating section that allocates, for a radio communication terminal apparatus with which the base station communicates using a plurality of downlink component bands, resource allocation information of downlink data directed to the radio communication terminal apparatus to CCEs of the same CCE number in a search space of a plurality of specific downlink component bands out of the plurality of downlink component bands and a receiving section that demodulates a response signal to downlink data in the specific downlink component bands based on a modulation scheme of an M-ary modulation value corresponding to the number of the specific downlink component bands.

A modulation method of the present invention for a radio communication terminal apparatus that communicates using the plurality of downlink component bands, blind-decodes CCEs in a search space of the plurality of downlink component bands and obtains resource allocation information of downlink data directed to the radio communication terminal apparatus and modulates, based on a modulation scheme of an M-ary modulation value corresponding to the number of specific downlink component bands in which the resource allocation information directed to the radio communication terminal apparatus is allocated to CCEs of the same CCE number of the plurality of downlink component bands, a response signal to the downlink data in the specific downlink component bands.

Advantageous Effects of Invention

According to the present invention, even when wideband transmission is performed using only a downlink, CCEs can be flexibly allocated without ACK/NACK signals colliding between a plurality of component bands.

DESCRIPTION OF EMBODIMENTS

Figure 1:
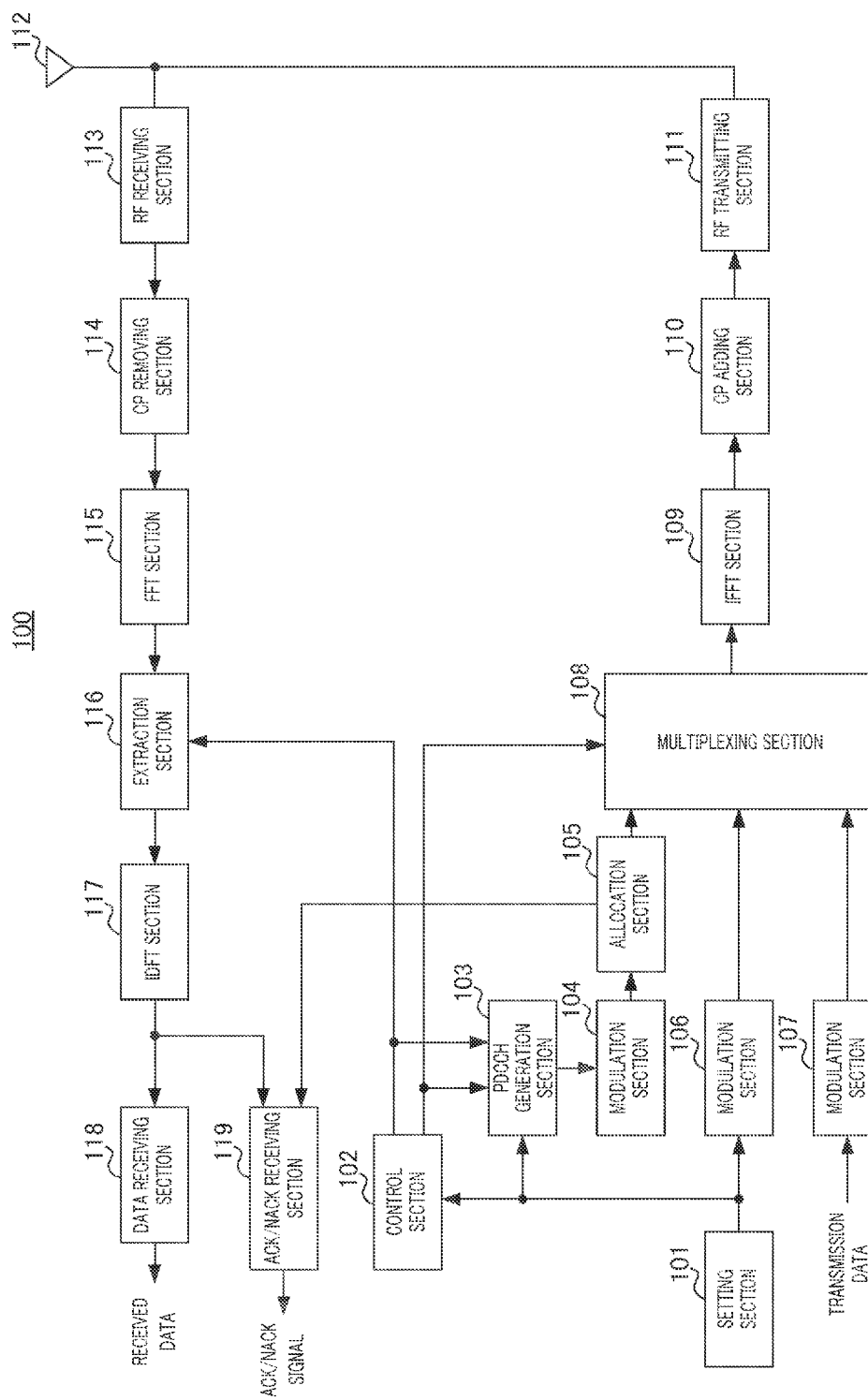
FIG. 1 is a block diagram illustrating a configuration of a base station according to Embodiment 1 of the present invention.

Hereinafter, embodiments of the present invention will be described in detail with reference to the accompanying drawings. In the following embodiments, the same components will be assigned the same reference numerals and overlapping explanations will be omitted.

Embodiment 1

FIG. 1 is a block diagram illustrating a configuration of base station 100 according to the present embodiment.

In base station 100 shown in FIG. 1, setting section 101 sets (configures) one or a plurality of component bands to use for an uplink and a downlink per terminal according to a required transmission rate and amount of data transmission or the like. Setting section 101 then outputs setting information including the component band set in each terminal to control section 102, PDCCH generation section 103 and modulation section 106.

Control section 102 generates uplink resource allocation information indicating uplink resources (e.g. PUSCH) to which uplink data of a terminal is allocated and downlink resource allocation information indicating downlink resources (e.g. PDSCH (Physical Downlink Shared Channel)) to which downlink data directed to the terminal is allocated. Control section 102 then outputs the uplink resource allocation information to PDCCH generation section 103 and extraction section 116 and outputs the downlink resource allocation information to PDCCH generation section 103 and multiplexing section 108. Here, control section 102 allocates uplink resource allocation information and downlink resource allocation information to PDCCHs arranged in downlink component bands set in each terminal based on the setting information inputted from setting section 101. To be more specific, control section 102 allocates the downlink resource allocation information to PDCCHs arranged in the downlink component bands to be subjected to resource allocation indicated in the downlink resource allocation information. Furthermore, control section 102 allocates uplink resource allocation information to PDCCHs arranged in downlink component bands associated with the uplink component bands to be subjected to resource allocation indicated in the uplink allocation information. A PDCCH is made up of one or a plurality of CCEs.

PDCCH generation section 103 generates a PDCCH signal including the uplink resource allocation information and downlink resource allocation information inputted from control section 102. Furthermore, PDCCH generation section 103 adds a CRC bit to the PDCCH signal to which the uplink resource allocation information and downlink resource allocation information have been allocated and further masks (or scrambles) the CRC bit with the terminal ID. PDCCH generation section 103 then outputs the masked PDCCH signal to modulation section 104.

Modulation section 104 modulates the PDCCH signal inputted from PDCCH generation section 103 after channel coding and outputs the modulated PDCCH signal to allocation section 105.

Allocation section 105 allocates the PDCCH signal of each terminal inputted from modulation section 104 to a CCE in a search space per terminal in a downlink component band in each component band. For example, allocation section 105 calculates a search space of each of the plurality of downlink component bands set in each terminal from the terminal ID of each terminal, CCE number calculated using a hash function for performing randomization and the number of CCEs (L) making up the search space. That is, allocation section 105 sets the CCE number calculated using the terminal ID of a certain terminal and a hash function at the start position (CCE number) of the search space of the terminal and sets consecutive CCEs corresponding to the number of CCEs L from the start position as the search space of the terminal. Here, allocation section 105 sets the same search space (search space made up of CCEs of the same CCE number) between a plurality of downlink component bands set per terminal. Allocation section 105 then outputs the PDCCH signal allocated to the CCE to multiplexing section 108. Furthermore, allocation section 105 outputs information indicating the CCE to which the PDCCH signal (resource allocation information) has been allocated to ACK/NACK receiving section 119. Details of CCE allocation processing in allocation section 105 will be described later.

Modulation section 106 modulates the setting information inputted from setting section 101, and outputs the modulated setting information to multiplexing section 108.

Modulation section 107 modulates inputted transmission data (downlink data) after channel coding and outputs the modulated transmission data signal to multiplexing section 108.

Multiplexing section 108 multiplexes the PDCCH signal inputted from allocation section 105, the setting information inputted from modulation section 106 and the data signal (that is, PDSCH signal) inputted from modulation section 107. Here, multiplexing section 108 maps the PDCCH signal and data signal (PDSCH signal) to each downlink component band based on the downlink resource allocation information inputted from control section 102. Multiplexing section 108 may also map the setting information to a PDSCH. Multiplexing section 108 then outputs the multiplexed signal to IFFT (Inverse Fast Fourier Transform) section 109.

IFFT section 109 transforms the multiplexed signal inputted from multiplexing section 108 into a time waveform and CP (Cyclic Prefix) adding section 110 adds a CP to the time waveform and thereby obtains an OFDM signal.

RF transmitting section 111 applies radio transmission processing (up-conversion, digital/analog (D/A) conversion or the like) to the OFDM signal inputted from CP adding section 110, and transmits the OFDM signal via antenna 112.

On the other hand, RF receiving section 113 applies radio receiving processing (down-conversion, analog/digital (A/D) conversion or the like) to the received radio signal received in a reception band via antenna 112, and outputs the received signal obtained to CP removing section 114.

CP removing section 114 removes a CP from the received signal and FFT (Fast Fourier Transform) section 115 transforms the received signal after the CP removal into a frequency domain signal.

Extraction section 116 extracts uplink data from the frequency domain signal inputted from FFT section 115 based on the uplink resource allocation information inputted from control section 102. IDFT (Inverse Discrete Fourier transform) section 117 then transforms the extracted signal into a time domain signal and outputs the time domain signal to data receiving section 118 and ACK/NACK receiving section 119.

Data receiving section 118 decodes the time domain signal inputted from IDFT section 117. Data receiving section 118 outputs the decoded uplink data as received data.

ACK/NACK receiving section 119 extracts an ACK/NACK signal from each terminal corresponding to downlink data (PDSCH signal) of the time domain signal inputted from IDFT section 117 from a PUCCH associated with a CCE used to allocate the downlink data. ACK/NACK receiving section 119 then makes an ACK/NACK decision on the extracted ACK/NACK signal. Here, when base station 100 allocates a PDCCH signal including downlink resource allocation information of downlink data (PDSCH signal) of a plurality of component bands to CCEs of downlink component bands of a plurality of component bands, ACK/NACK receiving section 119 extracts a plurality of ACK/NACK signals from PUCCHs associated with the CCE numbers of the respective CCEs.

Furthermore, when allocation section 105 allocates resource allocation information of downlink data directed to one terminal to CCEs of the same CCE number of a plurality of specific downlink component bands, ACK/NACK receiving section 119 demodulates an ACK/NACK signal corresponding to downlink data in a specific downlink component band based on a modulation scheme of an M-ary modulation value corresponding to the number of specific downlink component bands to which CCEs of the same CCE number have been allocated. To be more specific, when downlink resource allocation information is allocated to CCEs of the same CCE number in m downlink component bands, ACK/NACK receiving section 119 demodulates an ACK/NACK signal based on a modulation scheme of M-ary modulation value $2^m$ (e.g. QPSK when m=2 (M-ary modulation value: 4), 16QAM when m=4 and 64QAM when m=6). Thus, ACK/NACK receiving section 119 obtains respective ACK/NACK signals corresponding to downlink data of a plurality of component bands allocated using CCEs of the same CCE number.

Figure 2:
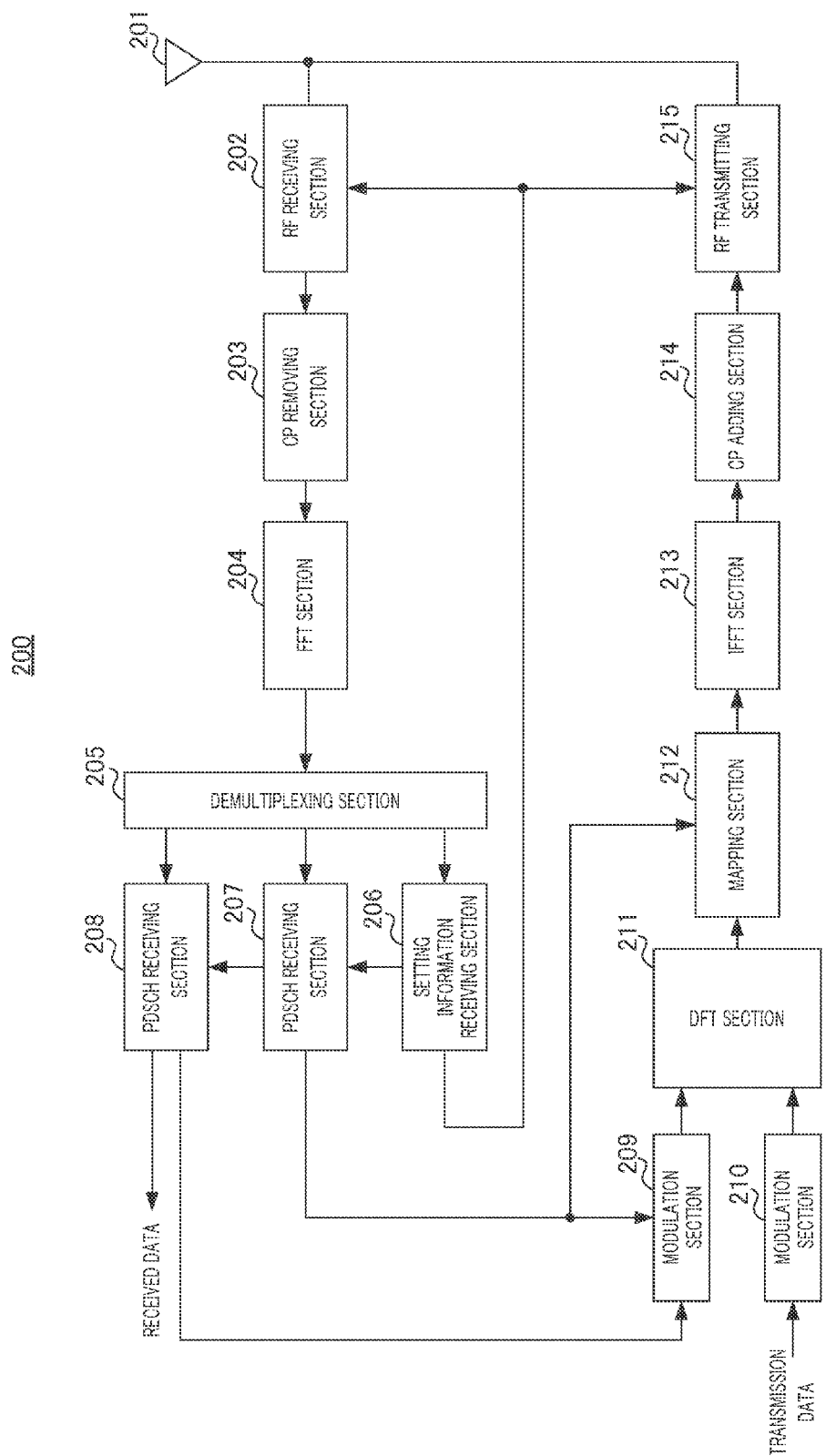
FIG. 2 is a block diagram illustrating a configuration of a terminal according to Embodiment 1 of the present invention.

FIG. 2 is a block diagram illustrating a configuration of terminal 200 according to the present embodiment. Terminal 200 receives a data signal (downlink data) using a plurality of downlink component bands and transmits an ACK/NACK signal for the data signal to base station 100 using a PUCCH of one uplink component band.

In terminal 200 shown in FIG. 2, RF receiving section 202 is configured to be able to change a reception band and changes the reception band based on band information inputted from setting information receiving section 206. RF receiving section 202 applies radio receiving processing (down-conversion, analog/digital (A/D) conversion or the like) to the received radio signal (here, OFDM signal) received in the reception band via antenna 201, and outputs the received signal obtained to CP removing section 203.

CP removing section 203 removes a CP from the received signal and FFT section 204 transforms the received signal after the CP removal into a frequency domain signal. The frequency domain signal is outputted to demultiplexing section 205.

Demultiplexing section 205 demultiplexes the signal inputted from FFT section 204 into a control signal (e.g. RRC signaling) of a higher layer including setting information, PDCCH signal and data signal (that is, PDSCH signal). Demultiplexing section 205 outputs the control information to setting information receiving section 206, outputs the PDCCH signal to PDCCH receiving section 207 and outputs the PDSCH signal to PDSCH receiving section 208.

Setting information receiving section 206 reads information indicating uplink component bands and downlink component bands set in the terminal from the control signal inputted from demultiplexing section 205, and outputs the read information to PDCCH receiving section 207, RF receiving section 202 and RF transmitting section 215 as band information. Furthermore, setting information receiving section 206 reads information indicating the terminal ID set in the terminal from the control signal inputted from demultiplexing section 205 and outputs the read information to PDCCH receiving section 207 as terminal ID information.

PDCCH receiving section 207 blind-decodes the PDCCH signal inputted from demultiplexing section 205 and obtains a PDCCH signal (downlink resource allocation information) directed to the terminal. Here, the PDCCH signal is allocated to each CCE (that is, PDCCH) arranged in the downlink component band set in the terminal indicated in the band information inputted from setting information receiving section 206. To be more specific, PDCCH receiving section 207 calculates a search space of the terminal using the terminal ID of the terminal indicated in the terminal ID information inputted from setting information receiving section 206. All search spaces (CCE numbers of CCEs constituting the search space) calculated here are the same between a plurality of downlink component bands set in the terminal. PDCCH receiving section 207 then demodulates and decodes the PDCCH signal allocated to each CCE in the calculated search space. PDCCH receiving section 207 demasks a CRC bit with the terminal ID of the terminal indicated in the terminal ID information for the decoded PDCCH signal and thereby decides the PDCCH signal which results in CRC=OK (no error) to be a PDCCH signal directed to the terminal. PDCCH receiving section 207 performs the above-described blind decoding on each component band to which a PDCCH signal has been transmitted and thereby acquires resource allocation information of the component band. PDCCH receiving section 207 outputs downlink resource allocation information included in the PDCCH signal directed to the terminal to PDSCH receiving section 208 and outputs uplink resource allocation information to mapping section 212. Furthermore, PDCCH receiving section 207 outputs the CCE number of the CCE (CCE resulting in CRC=OK) from which the PDCCH signal directed to the terminal is detected in each component band to mapping section 212.

Furthermore, PDCCH receiving section 207 calculates an M-ary modulation value (modulation level) of an ACK/NACK signal based on the number of specific downlink component bands in which the PDCCH signal (downlink resource allocation information) directed to the terminal is allocated to CCEs of the same CCE number of the plurality of downlink component bands set in the terminal. To be more specific, when the number of component bands of the plurality of downlink component bands set in the terminal in which the PDCCH signal directed to the terminal is allocated to CCEs of the same CCE number is m, PDCCH receiving section 207 assumes the M-ary modulation value (modulation level) of the ACK/NACK signal to be $2^m$. PDCCH receiving section 207 then outputs calculated M-ary modulation value $2^m$ to modulation section 209.

PDSCH receiving section 208 extracts received data (downlink data) from the PDSCH signal inputted from demultiplexing section 205 based on the downlink resource allocation information inputted from PDCCH receiving section 207. Furthermore, PDSCH receiving section 208 performs error detection on the extracted received data (downlink data). When the error detection result shows that an error is detected in the received data, PDSCH receiving section 208 generates an NACK signal as the ACK/NACK signal and generates an ACK signal as the ACK/NACK signal when no error is detected in the received data. PDSCH receiving section 208 then outputs the ACK/NACK signal to modulation section 209.

Modulation section 209 modulates the ACK/NACK signal inputted from PDSCH receiving section 208 based on the modulation scheme of the M-ary modulation value ($2^m$) inputted from PDCCH receiving section 207. That is, modulation section 209 modulates the ACK/NACK signal corresponding to the downlink data in specific downlink component bands based on the modulation scheme of the M-ary modulation value corresponding to the number of the specific downlink component bands in which the PDCCH signal (downlink resource allocation information) directed to the terminal is allocated to CCEs of the same CCE number of the plurality of downlink component bands set in the terminal. This allows modulation section 209 to obtain modulated symbols including the respective ACK/NACK signals corresponding to the downlink data in the specific downlink component bands. Modulation section 209 then outputs the modulated ACK/NACK signals to DFT (Discrete Fourier transform) section 211.

Modulation section 210 modulates the transmission data (uplink data) and outputs the modulated data signal to DFT section 211.

DFT section 211 transforms the ACK/NACK signals inputted from modulation section 209 and the data signal inputted from modulation section 210 into a frequency domain signal and outputs a plurality of frequency components obtained to mapping section 212.

Mapping section 212 maps the frequency component corresponding to the data signal out of the plurality of frequency components inputted from DFT section 211 to a PUSCH arranged in the uplink component band according to the uplink resource allocation information inputted from PDCCH receiving section 207. Furthermore, mapping section 212 maps the frequency components or code resources corresponding to the ACK/NACK signals out of the plurality of frequency components inputted from DFT section 211 to a PUCCH arranged in the uplink component band according to the CCE number inputted from PDCCH receiving section 207.

Figure 3:
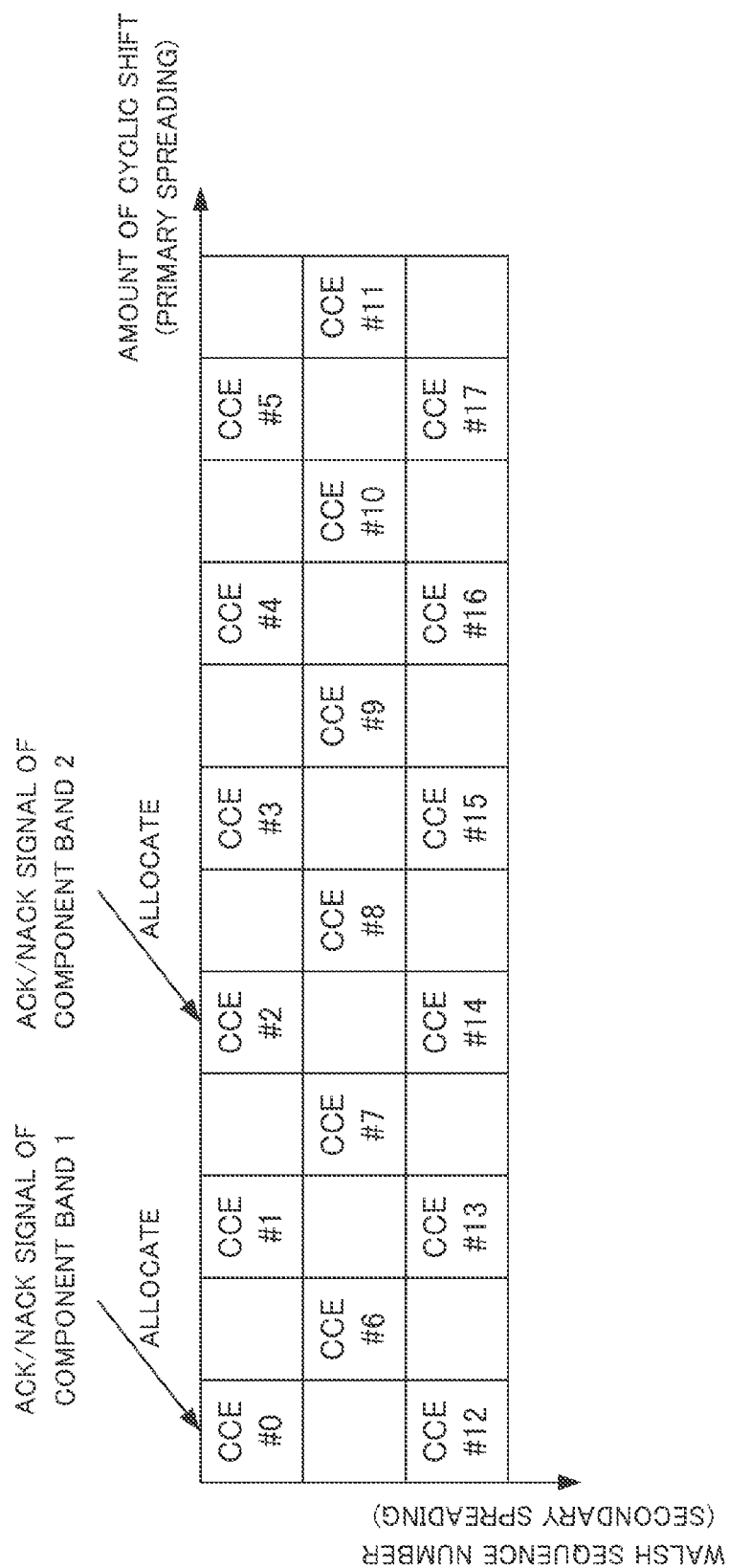
FIG. 3 is a diagram illustrating PUCCH resources associated with each CCE according to Embodiment 1 of the present invention.

For example, as shown in FIG. 3, PUCCH resources are defined using a primary spreading sequence (amount of cyclic shift of ZAC (Zero Auto Correlation) sequence) and a secondary spreading sequence (block-wise spread code such as Walsh sequence). That is, mapping section 212 allocates ACK/NACK signals to primary spreading sequences and secondary spreading sequences associated with the CCE numbers inputted from PDCCH receiving section 207. Furthermore, the PUCCH shown in FIG. 3 is shared between a plurality of downlink component bands. Thus, when PDSCH signals are transmitted in a plurality of downlink component bands, mapping section 212 allocates ACK/NACK signals corresponding to the PDSCH signals transmitted in the respective downlink component bands to PUCCH resources associated with the CCE numbers of CCEs used for allocation of the PDSCH signals. For example, an ACK/NACK signal corresponding to a PDSCH signal allocated using CCE #0 of a downlink component band of component band 1 is allocated to a PUCCH resource corresponding to CCE #0 shown in FIG. 3. Likewise, an ACK/NACK signal corresponding to a PDSCH signal allocated using CCE #2 of a downlink component band of component band 2 is allocated to a PUCCH resource corresponding to CCE #2 shown in FIG. 3. Furthermore, when, for example, a PDSCH signal of the downlink component band of component band 1 is allocated using CCE #0 of component band 1 and a PDSCH signal of the downlink component band of component band 2 is allocated using CCE #0 of component band 2, ACK/NACK signals corresponding to these PDSCH signals are allocated to PUCCH resources (not shown) corresponding to CCE #0 shown in FIG. 3.

Modulation section 209, modulation section 210, DFT section 211 and mapping section 212 may be provided for each component band.

IFFT section 213 transforms a plurality of frequency components mapped to the PUSCH into a time domain waveform, and CP adding section 214 adds a CP to the time domain waveform.

RF transmitting section 215 is configured to be able to change a transmission band and sets a transmission band based on the band information inputted from setting information receiving section 206. RF transmitting section 215 then applies radio transmission processing (up-conversion, digital/analog (D/A) conversion or the like) to the CP-added signal and transmits the signal via antenna 201.

Next, details of operations of base station 100 and terminal 200 will be described.

Figure 4:
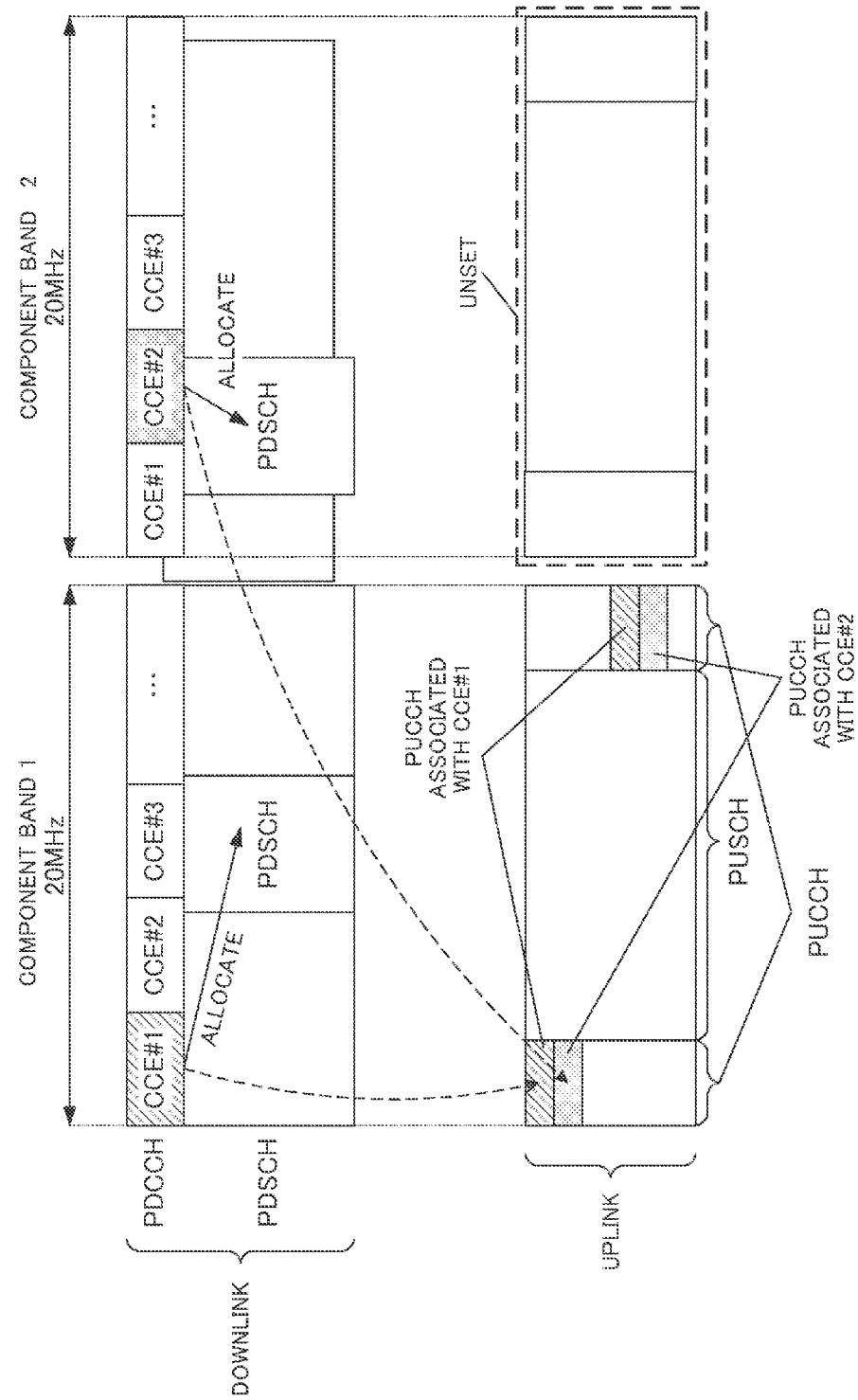
FIG. 4 is a diagram illustrating transmission of an ACK/NACK signal according to Embodiment 1 of the present invention.
Figure 5:
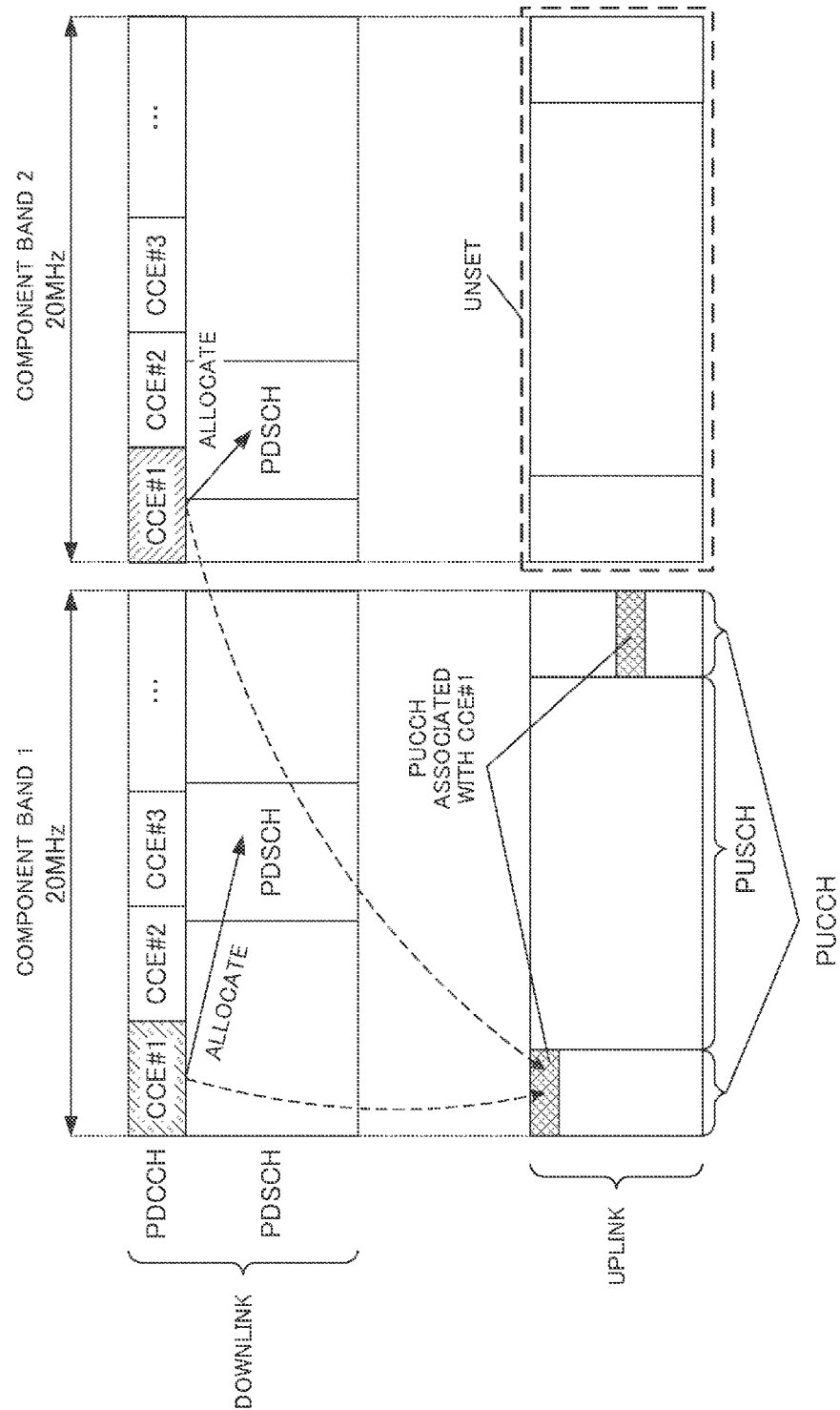
FIG. 5 is a diagram illustrating transmission of an ACK/NACK signal according to Embodiment 1 of the present invention.

In the following descriptions, setting section 101 (FIG. 1) of base station 100 sets two downlink component bands (component band 1 and component band 2) and one uplink component band (component band 1) in terminal 200 as shown in FIG. 4 and FIG. 5. That is, as shown in FIG. 4 and FIG. 5, setting section 101 sets both the uplink component band and downlink component band for component band 1 in terminal 200, while for component band 2, setting section 101 does not set any uplink component band (unset) but sets only the downlink component band. That is, base station 100 communicates with terminal 200 using two downlink component bands and one uplink component band, which is one component band fewer than the downlink component bands.

Furthermore, as shown in FIG. 4 and FIG. 5, the PDCCH arranged in each downlink component band is made up of a plurality of CCEs (CCE #1, CCE #2, CCE #3, . . . ). Furthermore, as shown in FIG. 4 and FIG. 5, component band 1 and component band 2 share PUCCHs (e.g. FIG. 3) arranged in the uplink component band of component band 1. Thus, terminal 200 transmits an ACK/NACK signal to base station 100 using a resource area of one PUCCH arranged in the uplink component band of component band 1 associated with the CCE used to allocate the PDSCH signal regardless of the component band in which the PDSCH signal has been received.

Here, allocation section 105 allocates a PDCCH signal including downlink resource allocation information to CCEs in such a way that PUCCHs (ACK/NACK resources) for ACK/NACK signals do not collide between a plurality of downlink component bands as much as possible. For example, as shown in FIG. 4, a PDCCH signal including downlink resource allocation information (that is, information indicating PDSCH allocation of component band 1) of component band 1 is allocated to CCE #1 of the downlink component band of component band 1. In this case, allocation section 105 allocates a PDCCH signal including downlink resource allocation information (that is, information indicating PDSCH allocation of component band 2) of component band 2 to a CCE other than CCE #1 (CCE #2 in FIG. 4) in the downlink component band of component band 2. On the other hand, when a PDCCH signal including downlink resource allocation information of component band 1 is allocated to a CCE, allocation section 105 allocates a PDCCH signal including downlink resource allocation information of component band 1 to a CCE other than CCE #2 used in the downlink component band of component band 2. Here, the other terminal in which the uplink component band of component band 2 (unset in terminal 200) is set uses a PUCCH arranged in the uplink component band of component band 2 to transmit an ACK/NACK signal to base station 100. That is, in the PUCCH arranged in the uplink component band of component band 1, no collision occurs between terminal 200 and the other terminal. For this reason, in the downlink component band of component band 2, allocation section 105 may allocate the PDCCH signal including downlink resource allocation information directed to the other terminal to CCE #1 used in component band 1 (not shown).

Here, as shown in FIG. 5, suppose base station 100 allocates PDCCH signals to CCEs of the same CCE number (CCE #1 in FIG. 5) between a plurality of downlink component bands (component band 1 and component band 2 in FIG. 5) set in terminal 200. In this case, terminal 200 modulates ACK/NACK signals corresponding to a plurality of pieces of downlink data transmitted using CCEs of the same CCE number based on a modulation scheme of an M-ary modulation value according to the number of downlink component bands (two in FIG. 5) to which CCEs of the same CCE number are allocated. Furthermore, terminal 200 transmits the modulated ACK/NACK signals using PUCCHs associated with the CCEs of the CCE number (CCEs allocated to a plurality of downlink component bands). That is, terminal 200 maps modulated symbols including the plurality of ACK/NACK signals corresponding to the plurality of pieces of downlink data transmitted using CCEs of the same CCE number to the PUCCHs associated with the CCEs.

Hereinafter, a case will be described more specifically where base station 100 allocates PDCCH signals in a plurality of component bands set in terminal 200 to CCEs of the same CCE number between a plurality of component bands.

Allocation section 105 (FIG. 1) of base station 100 allocates PDCCH signals of the respective downlink component bands to CCEs of the same CCE number of maximum $\log_2$ (M) downlink component bands out of the plurality of downlink component bands set in terminal 200. Here, M is a maximum value of the M-ary modulation value of ACK/NACK signals.

Here, the maximum value M of the M-ary modulation value may differ from one terminal to another. When, for example, a terminal located near the center of the cell transmits an ACK/NACK signal with a high M-ary modulation value, base station 100 receives the ACK/NACK signal with sufficient receiving quality. Thus, the maximum value M of the M-ary modulation value may be increased for the terminal located near the center of the cell. On the other hand, when a terminal located near the cell edge transmits an ACK/NACK signal with a high M-ary modulation value, base station 100 cannot receive the ACK/NACK signal with sufficient receiving quality. Therefore, the maximum value M of the M-ary modulation value may be decreased for the terminal located near the cell edge.

However, when, for example, two ACK/NACK signals (1 bit×2) are transmitted, a PAPR (Peak to Average Power Ratio) value or CM (Cubic Metric) value becomes lower by transmitting two QPSK-modulated ACK/NACK signals (that is, one modulated symbol) using one PUCCH than transmitting two BPSK-modulated ACK/NACK signals (that is, two modulated symbols) using two PUCCHs (that is, multi-code transmission). That is, in QPSK modulation, an ACK/NACK signal is transmitted at a lower PAPR value or CM value than in BPSK modulation. That is, in QPSK modulation, the maximum transmission power can be increased more than in BPSK modulation.

Thus, base station 100 may designate the M-ary modulation value corresponding to QPSK (that is, the M-ary modulation value: 4) for the terminal located near the cell edge as an upper limit for the M-ary modulation value corresponding to the number of specific downlink component bands. That is, allocation section 105 allocates PDCCH signals to CCEs of the same CCE number among maximum two (=$\log_2(4)$) downlink component bands for the terminal located near the cell edge. Modulation section 209 of the terminal located near the cell edge modulates an ACK/NACK signal transmitted from the terminal by designating the M-ary modulation value corresponding to QPSK (that is, the M-ary modulation value: 4) as an upper limit for the M-ary modulation value corresponding to the number of specific downlink component bands. Furthermore, a power control section (not shown) of terminal 200 uses higher transmission power of an ACK/NACK signal when modulation section 209 modulates the ACK/NACK signal using QPSK than the transmission power of the ACK/NACK signal when modulation section 209 modulates the ACK/NACK signal using BPSK. This makes it possible to improve receiving quality of the ACK/NACK signal in base station 100.

Next, a case will be described as shown in FIG. 5 where allocation section 105 of base station 100 allocates PDCCH signals (downlink resource allocation information) to CCE #1 which is the same CCE number of two (=log$_2$(4)) downlink component bands (component band 1 and component band 2).

PDCCH receiving section 207 of terminal 200 blind-decodes CCEs in a search space (not shown) of component band 1 and component band 2 shown in FIG. 5 and identifies that downlink resource information directed to the terminal is allocated to CCEs #1 of both component band 1 and component band 2. That is, the number of component bands (component band 1 and component band 2) in which PDCCH signals (downlink resource allocation information) are allocated to CCEs of the same CCE number (FIG. 5 CCE #1) is two. Therefore, PDCCH receiving section 207 calculates 4(=$2^2$) as M-ary modulation value $2^m$ of the ACK/NACK signals corresponding to the downlink data (PDSCH signals) allocated using CCEs #1 of both downlink component bands.

Figure 6:
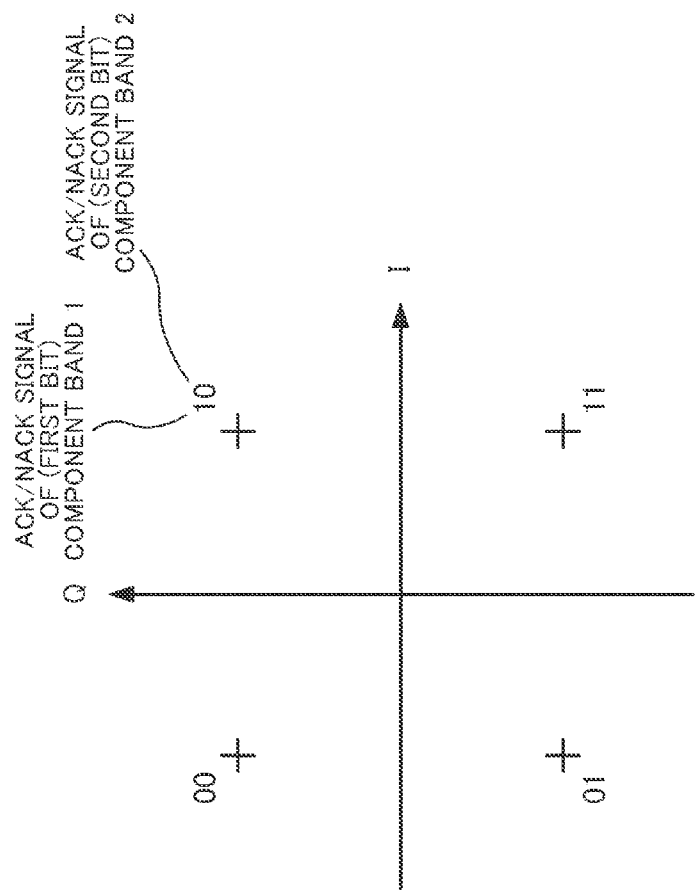
FIG. 6 is a diagram illustrating a signal constellation according to Embodiment 1 of the present invention.

Modulation section 209 then modulates the ACK/NACK signal (1 bit) corresponding to the downlink data allocated using CCE #1 of component band 1 and ACK/NACK signal (1 bit) corresponding to the downlink data allocated using CCE #1 of component band 2 based on QPSK which is the modulation scheme of M-ary modulation value $2^m$=4. To be more specific, as shown in FIG. 6, modulation section 209 QPSK-modulates the ACK/NACK signal by arranging two ACK/NACK signals (1 bit×2) of component band 1 and component band 2 at one of a plurality of signal points on the IQ plane. In FIG. 6, the ACK/NACK signal of component band 1 is arranged on the first bit (higher bit) at each signal point of QPSK and the ACK/NACK signal of component band 2 is arranged on the second bit (lower bit) of each signal point of QPSK. Furthermore, '1' represents ACK and '0' represents NACK in FIG. 6.

Thus, when, for example, the ACK/NACK signal of component band 1 is '1' (ACK) and the ACK/NACK signal of component band 2 is '1' (ACK), modulation section 209 arranges two ACK/NACK signals at signal point '11' shown in FIG. 6 as a QPSK signal. Likewise, when the ACK/NACK signal of component band 1 is '0' (NACK) and the ACK/NACK signal of component band 2 is '1' (ACK), modulation section 209 arranges two ACK/NACK signals at signal point '01' shown in FIG. 6 as a QPSK signal. The same applies to signal points '00' and '10.'

As shown in FIG. 5, mapping section 212 maps one modulated symbol including ACK/NACK signals of both component band 1 and component band 2 to PUCCHs associated with CCE #1.

On the other hand, ACK/NACK receiving section 119 of base station 100 demodulates an ACK/NACK signal based on QPSK which is the modulation scheme of the M-ary modulation value $2^m$=4 (QPSK) and thereby extracts the ACK/NACK signal of component band 1 (first bit of the signal point shown in FIG. 6) and the ACK/NACK signal of component band 2 (second bit of the signal point shown in FIG. 6) respectively.

Thus, when PDCCH signals (downlink resource allocation information) are allocated to CCEs of the same CCE number in a plurality of downlink component bands set in the terminal, that is, when CCEs associated with the same PUCCH are used in a plurality of component bands, terminal 200 increases the M-ary modulation value of the ACK/NACK signal. Thus, terminal 200 generates a modulated symbol including respective ACK/NACK signals corresponding to downlink data received in component bands using CCEs of the same CCE number. That is, terminal 200 can transmit ACK/NACK signals of a plurality of component bands using the same PUCCH. Thus, even when terminal 200 allocates PDCCH signals to CCEs of the same CCE number in both component band 1 and component band 2, no collision of ACK/NACK signals occurs between component band 1 and component band 2.

For example, there may be a case where only CCEs of the same CCE number (CCEs associated with the same PUCCH) remain between a plurality of downlink component bands set in terminal 200 through CCE allocation to another terminal having higher priority than terminal 200 or through CCE allocation to broadcast information with higher priority (e.g. BCH). However, as described above, terminal 200 can transmit respective ACK/NACK signals corresponding to downlink data of a plurality of component bands allocated using CCEs of the same CCE number to base station 100 using the same PUCCH.

For this reason, base station 100 can flexibly allocate CCEs in the respective downlink component bands without being limited by CCE allocation between different component bands set in terminal 200. That is, base station 100 can reduce the possibility that PDCCH signals that are not allocated to CCEs may limit data transmission.

Thus, according to the present embodiment, the terminal modulates ACK/NACK signals corresponding to PDSCH signals (downlink data) allocated using CCEs of the same CCE number of downlink component bands of different component bands based on a modulation scheme of an M-ary modulation value corresponding to the number of downlink component bands using CCEs of the same CCE number. This allows the terminal to map ACK/NACK signals corresponding to PDSCH signals (downlink data) allocated using CCEs of the same CCE number of a plurality of downlink component bands to the same PUCCH. Thus, also when performing wideband transmission only the downlink, that is, when performing narrowband transmission on the uplink, the base station can allocate PDCCH signals including resource allocation information to CCEs without causing collision of ACK/NACK signals between component bands. Thus, according to the present setting method, even when wideband transmission is performed only on the downlink, it is possible to flexibly allocate CCEs without causing collision of ACK/NACK signals between a plurality of component bands.

Furthermore, the present embodiment assumes QPSK as an upper limit of the M-ary modulation value set in ACK/NACK signals. This prevents ACK/NACK signals from being transmitted with a higher M-ary modulation value, that is, prevents receiving quality from deteriorating due to nonuniformity of distance between signal points, and can thereby reduce the error rate of ACK/NACK signals (that is, improve reliability of ACK/NACK signal transmission).

Furthermore, the present embodiment assumes the M-ary modulation value corresponding to QPSK to be an upper limit of the M-ary modulation value of ACK/NACK signals with respect to the downlink data allocated using CCEs of the same CCE number of a plurality of downlink component bands for the terminal located near the cell edge. This allows the terminal located near the cell edge to transmit ACK/NACK signals corresponding to the downlink data allocated using CCEs of the same CCE number in one symbol. That is, the terminal located near the cell edge can avoid multi-code transmission, and can thereby transmit ACK/NACK signals at a low PAPR value or low CM.

In the present embodiment, maximum value M of the M-ary modulation value may be notified from base station 100 to each terminal beforehand. When PDCCH signals are allocated to CCEs of the same CCE number among a number of component bands greater than $\log_2(M)$, this allows each terminal to determine that one of PDCCH signals allocated to the component bands has a reception error. Thus, each terminal can stop transmission of an ACK/NACK signal to base station 100.

Furthermore, maximum value M of the M-ary modulation value may also be set for each cell. Base station 100 may also notify M set in the cell of the terminal to another terminal located in the cell of the terminal.

Embodiment 2

For example, a case will be described where the base station allocates PDCCH signals to CCEs of the same CCE number of component band 1 and component band 2, transmits the PDCCH signals to one terminal and the terminal cannot receive the PDCCH signal of component band 1 (that is, the terminal receives only the PDCCH signal of component band 2).

Figure 7:
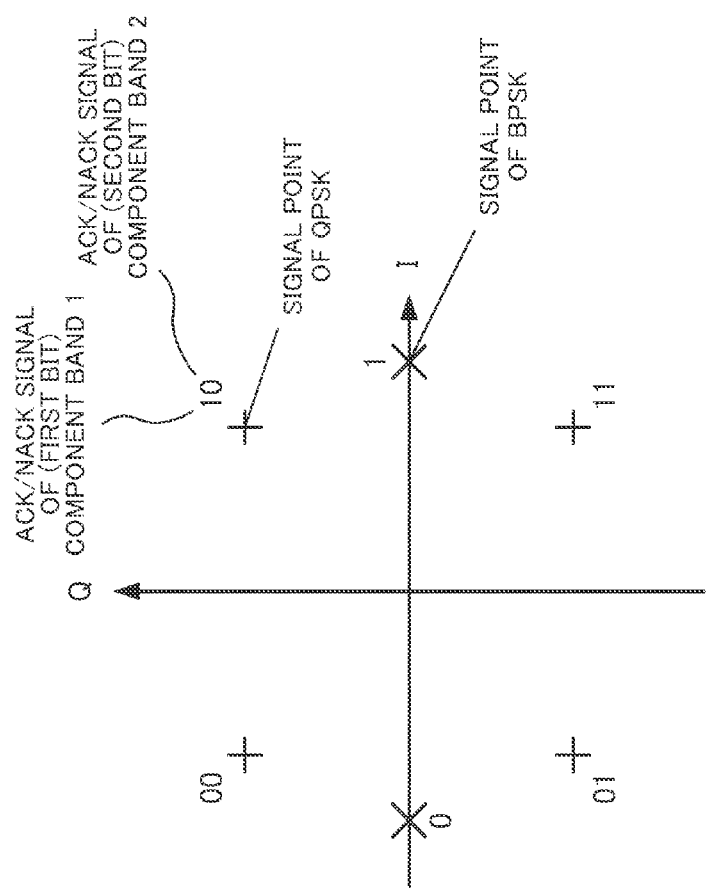
FIG. 7 is a diagram illustrating a problem according to Embodiment 2 of the present invention.

In this case, the terminal determines that CCEs of the same CCE number are not used in the two component bands. Thus, as shown in FIG. 7, the terminal arranges an ACK/NACK signal corresponding to the downlink data allocated with PDCCH signals of component band 2 at signal points of BPSK ('0' or '1' marked 'x' in FIG. 7) and transmits the ACK/NACK signal to the base station.

However, since the base station uses CCEs of the same CCE number in two downlink component bands, the base station receives the ACK/NACK signal based on signal points of QPSK of the M-ary modulation value $4(=2^2)$ ('00' to '11' marked '+' in FIG. 7) as in the case of Embodiment 1. That is, the base station makes a decision on the ACK/NACK signal of component band 1 assuming the Q-axis shown in FIG. 7 as the deicing axis and makes a decision on the ACK/NACK signal of component band 2 assuming the I-axis shown in FIG. 7 as the decision axis.

A case will be described in FIG. 7 as an example where the terminal transmits '1' (ACK) as an ACK/NACK signal of component band 2 using a BPSK signal (that is, arranges the signal at '1' on the I-axis). Since the base station makes a decision on an ACK/NACK signal based on signal points of QPSK, when a channel estimation error or influences of noise are small, the base station decides the received ACK/NACK signal to be '1: ACK' of component band 1 (decision axis: Q-axis). Furthermore, since the received ACK/NACK signal is arranged on the I-axis, the base station makes a decision on the ACK/NACK signal from the terminal to be DTX (Discontinuous Transmission) which is not to be transmitted in component band 2 (decision axis: I-axis).

That is, although the terminal has not received downlink data of component band 1, the base station decides that the terminal has successfully received the downlink data in component band 1 (ACK). Furthermore, although the terminal has successfully received the downlink data of component band 2, the base station decides that the terminal has not successfully received the downlink data in component band 2 and retransmits retransmission data. Thus, although the base station has transmitted a PDCCH signal of a certain component band, if the terminal cannot receive the PDCCH of the component band, the base station cannot identify ACK/NACK accurately and the data throughput deteriorates in consequence.

Thus, in the present embodiment, when using BPSK, modulation section 209 of terminal 200 arranges ACK/NACK signals of downlink component bands having odd band numbers of a plurality of downlink component bands at signal points on the I-axis and arranges ACK/NACK signals of downlink component bands having even band numbers at signal points on the Q-axis. That is, modulation section 209 modulates an ACK/NACK signal of each downlink component band using signal points associated with band numbers of a plurality of downlink component bands.

Hereinafter, this will be described more specifically. Here, suppose an upper limit of the M-ary modulation value of an ACK/NACK signal is 4 (that is, QPSK).

Allocation section 105 (FIG. 1) of base station 100 according to the present embodiment allocates PDCCH signals transmitted from each downlink component band of a plurality of downlink component bands set in terminal 200 to CCEs of the same CCE number in maximum $2 (=\log_2(4))$ downlink component bands.

ACK/NACK receiving section 119 demodulates an ACK/NACK signal based on a modulation scheme of M-ary modulation value $2^m$ as in the case of Embodiment 1. However, ACK/NACK receiving section 119 demodulates ACK/NACK signals corresponding to downlink data allocated using, for example, CCEs of odd-numbered component bands through a bit decision (that is, bit decision assuming the Q-axis as the decision axis) on the I-axis of PUCCHs associated with the CCEs. On the other hand, ACK/NACK receiving section 119 demodulates ACK/NACK signals corresponding to downlink data allocated using, for example, CCEs of even-numbered component bands through a bit decision (that is, bit decision assuming the I-axis as the decision axis) on the Q-axis of PUCCHs associated with the CCEs.

On the other hand, when using BPSK (when CCEs of the same CCE number between a plurality of downlink component bands are not used), modulation section 209 of terminal 200 according to the present embodiment arranges ACK/NACK signals corresponding to the downlink data allocated using CCEs of odd-numbered component bands on the I-axis and arranges ACK/NACK signals corresponding to the downlink data allocated using CCEs of even-numbered component bands on the Q-axis. That is, in modulation section 209, the numbers of component bands (odd number and even number) and the I-axis and Q-axis are associated with each other beforehand and the axis used (I-axis or Q-axis) differs per component band.

Figure 8:
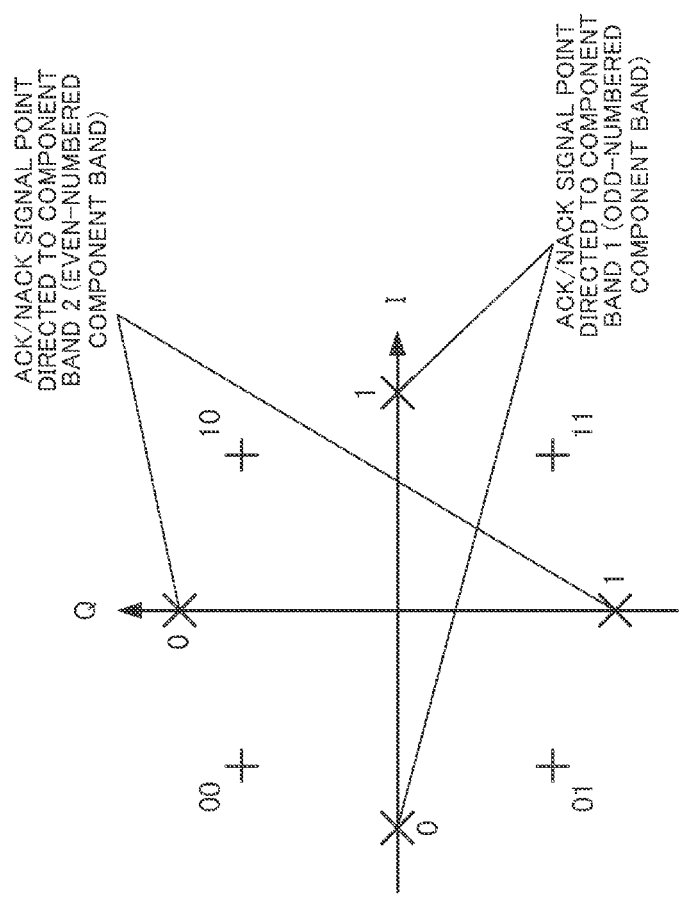
FIG. 8 is a diagram illustrating a signal constellation according to Embodiment 2 of the present invention.

For example, on the IQ-plane shown in FIG. 8, modulation section 209 arranges an ACK/NACK signal of component band 1 which is an odd-numbered component band at a signal point ('0' or '1') on the I-axis and thereby transmits the ACK/NACK signal as a BPSK signal. Likewise, as shown in FIG. 8, modulation section 209 arranges an ACK/NACK signal of component band 2 which is an even-numbered component band at a signal point ('0' or '1') on the Q-axis and thereby transmits the ACK/NACK signal as a BPSK signal.

Furthermore, when CCEs of the same CCE number between a plurality of downlink component bands are used, modulation section 209 modulates ACK/NACK signals corresponding to downlink data allocated using the CCEs based on QPSK as in the case of Embodiment 1. That is, as shown in FIG. 8, QPSK signals (signal points marked '+' in FIG. 8) in which ACK/NACK signals in odd-numbered component bands and ACK/NACK signals in even-numbered component bands are multiplexed on the I-axis and Q-axis are transmitted. Here, base station 100 may also schedule CCE allocation so as not to use CCEs of the same CCE number among odd-numbered (or even-numbered) component bands.

Next, a case will be described where base station 100 allocates PDCCH signals to CCEs of the same CCE number in both component band 1 and component band 2 and terminal 200 cannot receive the PDCCH signal of component band 1 (that is, when the terminal receives only the PDCCH signal of component band 2). Here, a case will be described in FIG. 8 as in the case of FIG. 7 where terminal 200 transmits '1' (ACK) as an ACK/NACK signal of component band 2 using a BPSK signal as an example.

Modulation section 209 of terminal 200 arranges an ACK/NACK signal ('1' (ACK)) corresponding to the downlink data of component band 2 at signal point '1' on the Q-axis associated with component band 2, that is, an even-numbered component band.

ACK/NACK receiving section 119 of base station 100 then makes a decision on the ACK/NACK signal of component band 2 through a bit decision on the Q-axis, that is, a bit decision assuming the I-axis as a decision axis. As shown in FIG. 8, ACK/NACK receiving section 119 makes a decision on the received ACK/NACK signal ('1' on the Q-axis) as ACK of component band 2. Furthermore, ACK/NACK receiving section 119 makes a decision on the ACK/NACK signal of component band 1 through a bit decision on the I-axis, that is, a bit decision assuming the Q-axis as a decision axis. As shown in FIG. 8, since the received ACK/NACK signal is arranged on the Q-axis, ACK/NACK receiving section 119 decides that component band 1 is DTX and retransmits the downlink data of component band 1.

By this means, in the present embodiment, the I-axis or Q-axis is associated with each component band as the axis on which a bit decision is made on an ACK/NACK signal. Thus, the base station can identify an ACK/NACK signal on the I-axis and Q-axis independently of each other. Thus, although the base station transmits PDCCH signals allocated to CCEs of the same CCE number in a plurality of component bands, even if the terminal cannot receive the PDCCH signal of one component band, the base station is more likely to be able to accurately identify an ACK/NACK signal for each component band associated with the I-axis or Q-axis. Furthermore, in the component band in which the terminal cannot receive the PDCCH signal, the base station is more likely to be able to identify DTX (that is, the terminal does not transmit any ACK/NACK signal). Thus, according to the present embodiment, it is possible to obtain effects similar to those in Embodiment 1 and at the same time accurately make a decision on an ACK/NACK signal of each component band even when the terminal cannot receive some PDCCH signals.

In the present embodiment, association of a component band with the IQ axes may be notified from base station 100 to each terminal.

Furthermore, a case has been described in the present embodiment where when using BPSK, modulation section 209 of terminal 200 arranges ACK/NACK signals of odd-numbered component bands on the I-axis and ACK/NACK signals of even-numbered component bands on the Q-axis. However, in the present invention, when using BPSK, modulation section 209 may arrange ACK/NACK signals of even-numbered component bands on the I-axis and ACK/NACK signals of odd-numbered component bands on the Q-axis. Furthermore, in the present invention, the axis on which ACK/NACK signals are arranged is not limited to the IQ axes but, for example, axes resulting from rotating the IQ axes by 45 degrees may also be used.

Furthermore, a case has been described in the present embodiment where base station 100 makes a decision on an ACK/NACK signal of each component band using the IQ axes as a decision axis. However, in the present invention, the decision axis is not limited to IQ axes and, for example, base station 100 may make a decision on an ACK/NACK signal of each component band using, for example, an axis resulting from rotating the IQ-axis by 45 degrees as a decision axis.

Embodiments of the present invention have been described so far.

In the above embodiments, the present invention is also applicable to one of cases where the number of CCEs occupied by one PDCCH (number of CCEs aggregated: CCE aggregation level) is one and plural. Furthermore, a search space may be calculated for each CCE aggregation level occupied by one PDCCH, and the number of CCEs L making up the search space may be made different depending on the CCE aggregation level.

Furthermore, a case has been described in the above embodiments where odd-numbered component bands and even-numbered component bands are associated with IQ axes, respectively. However, in the present invention, an anchor band having high priority and component bands other than the anchor band may be used as component bands to be associated with IQ axes respectively.

Furthermore, a case has been described in the above embodiments where the base station sets the same search space (that is, search space made up of CCEs of the same CCE number) between a plurality of downlink component bands set in the terminal. However, the base station in the present invention may also set a search space which differs between a plurality of downlink component bands set in the terminal. In this case, the base station can allocate CCEs of the same CCE number between a plurality of downlink component bands to only CCEs which overlap each other among search spaces of a plurality of downlink component bands and apply the above embodiments.

Furthermore, CCEs described in the above embodiments are theoretical resources, and, when CCEs are arranged in actual physical time/frequency resources, CCEs are arranged to distribute over the entire band of a component band. Furthermore, CCEs may also be arranged in actual physical time/frequency resources distributed to the entire system band (that is, all component bands) as long as CCEs are at least divided per component band as theoretical resources.

Furthermore, a case has been described in the present embodiment where one ACK/NACK signal is transmitted for a PDSCH of one component band. However, when a plurality of ACK/NACK signals are transmitted to a PDSCH of one component band such as during spatially multiplexed transmission by MIMO (Multiple-Input Multiple Output), the present invention transmits the ACK/NACK signals with an M-ary modulation value corresponding to a total number of ACK/NACKs of component bands to which CCEs of the same CCE number are allocated, and can thereby obtain similar effects.

Furthermore, the present invention may use C-RNTI (Cell-Radio Network Temporary Identifier) as a terminal ID.

The present invention may perform a multiplication between bits (that is, between CRC bits and terminal IDs) or sum up bits and calculate mod 2 of the addition result (that is, remainder obtained by dividing the addition result by 2) as masking (scrambling) processing.

Furthermore, a case has been described in the above embodiments where a component band is defined as a band having a width of maximum 20 MHz and as a basic unit of communication bands. However, the component band may be defined as follows. For example, the downlink component band may also be defined as a band delimited by downlink frequency band information in a BCH (Broadcast Channel) broadcast from the base station, a band defined by a spreading width when a PDSCH is arranged distributed in a frequency domain or a band in which an SCH (synchronization channel) is transmitted in a central part. Furthermore, the uplink component band may also be defined as a band delimited by uplink frequency band information in a BCH broadcast from the base station or a basic unit of communication band having 20 MHz or less including a PUSCH in the vicinity of the center and PUCCHs (Physical Uplink Control Channel) at both ends.

Furthermore, although a case has been described in the above embodiments where the communication bandwidth of a component band is 20 MHz, the communication bandwidth of a component band is not limited to 20 MHz.

Furthermore, band aggregation may also be called "carrier aggregation." Furthermore, a component band may also be called "unit carrier (component carrier(s))" in LTE. Furthermore, band aggregation is not limited to a case where continuous frequency bands are aggregated, but discontinuous frequency bands may also be aggregated.

Furthermore, a component band of one or a plurality of uplinks set in each terminal by the base station may be called "UE UL component carrier set" and a component band of a downlink may be called "UE DL component carrier set."

Furthermore, the terminal may also be called "UE" and the base station may also be called "Node B or BS (Base Station)." Furthermore, the terminal ID may also be called "UE-ID."

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-281391, filed on Oct. 31, 2008, including the specification, drawings and abstract, is incorporated herein by reference in its entirety.

INDUSTRIAL APPLICABILITY

The present invention is applicable to a mobile communication system or the like.

The invention claimed is:

1. A radio communication terminal apparatus comprising:
at least one processor comprising:
a receiving section that receives resource allocation information of downlink data directed to the radio communication terminal apparatus, the resource allocation information being arranged in a plurality of downlink component bands set in the radio communication terminal apparatus, each of the plurality of downlink component bands including a downlink control channel and a downlink data channel; and
a transmitting section that transmits a response signal to the downlink data using uplink resources in one uplink component band corresponding to control channel element (CCE) numbers of CCEs in which the resource allocation information is arranged in the plurality of downlink component bands, the one uplink component band set in the radio communication terminal apparatus being one of a plurality of uplink component bands, each of the plurality of uplink component bands including an uplink data channel in a center of the band and including uplink control channels at both ends of the band,
wherein the transmitting section modulates, based on a modulation scheme of an M-ary modulation value corresponding to the number of specific downlink component bands in which the resource allocation information directed to the radio communication terminal apparatus is allocated to CCEs of the same CCE number out of the plurality of downlink component bands, the response signal to the downlink data in the specific downlink component bands.

2. The radio communication terminal apparatus according to claim 1, wherein the same uplink resources in the one uplink component band are associated with the same CCE number in the plurality of downlink component bands.

3. The radio communication terminal apparatus according to claim 1, wherein the transmitting section modulates the response signal based on M-ary modulation value $2^m$ corresponding to the number of specific downlink component bands m.

4. The radio communication terminal apparatus according to claim 1, wherein the transmitting section assumes the M-ary modulation value corresponding to QPSK to be an upper limit of the M-ary modulation value corresponding to the number of specific downlink component bands.

5. The radio communication terminal apparatus according to claim 1, wherein the at least one processor further includes a control section that causes transmission power of the response signal when the transmitting section uses QPSK to be greater than transmission power of the response signal when the transmitting section uses BPSK.

6. The radio communication terminal apparatus according to claim 1, wherein the transmitting section modulates response signals to the downlink data received in each of the plurality of downlink component bands, using signal points associated with band numbers of the plurality of downlink component bands.

7. The radio communication terminal apparatus according to claim 1, wherein when using BPSK, the transmitting section arranges, of the plurality of downlink component bands, the response signals of downlink component bands whose band numbers are odd-numbered at signal points on the I-axis and the response signals of downlink component bands whose band numbers are even-numbered at signal points on the Q-axis.

8. The radio communication terminal apparatus according to claim 1, wherein the transmitting section arranges, of the plurality of downlink component bands, the response signals of downlink component bands whose band numbers are even-numbered at signal points on the I-axis and the response signals of downlink component bands whose band numbers are odd-numbered at signal points on the Q-axis.

9. A radio communication base station apparatus comprising:
at least one processor comprising:
an arrangement section that arranges resource allocation information of downlink data directed to a radio communication terminal apparatus in control channel elements (CCEs) in a plurality of downlink component bands set in the radio communication terminal apparatus, each of the plurality of downlink component bands including a downlink control channel and a downlink data channel; and a receiving section that receives a response signal to the downlink data transmitted from the radio communication terminal apparatus using uplink resources in one uplink component band corresponding to CCE numbers of the CCEs, the one uplink component band set in the radio communication terminal apparatus being one of a plurality of uplink component bands, each of the plurality of uplink component bands including an uplink data in a center of the band and including uplink control channels at both ends of the band, wherein the radio communication terminal apparatus modulates, based on a modulation scheme of an M-ary modulation value corresponding to the number of specific downlink component bands in which the resource allocation information directed to the radio communication terminal apparatus is allocated to CCEs of the same CCE number out of the plurality of downlink component bands, the response signal to the downlink data in the specific downlink component bands.

10. A response signal transmission method performed by a radio communication terminal apparatus, the response signal transmission method comprising:

receiving resource allocation information of downlink data directed to the radio communication terminal apparatus, the resource allocation information being arranged in a plurality of downlink component bands set in the radio communication terminal apparatus, each of the plurality of downlink component bands including a downlink control channel and a downlink data channel; and transmitting a response signal to the downlink data using uplink resources in one uplink component band corresponding to control channel element (CCE) numbers of CCEs in which the resource allocation information is arranged in the plurality of downlink component bands, the one uplink component band set in the radio communication terminal apparatus being one of a plurality of uplink component bands, each of the plurality of uplink component bands including an uplink data in a center of the band and including uplink control channels at both ends of the band, wherein the radio communication terminal apparatus modulates, based on a modulation scheme of an M-ary modulation value corresponding to the number of specific downlink component bands in which the resource allocation information directed to the radio communication terminal apparatus is allocated to CCEs of the same CCE number out of the plurality of downlink component bands, the response signal to the downlink data in the specific downlink component bands.

* * * * *